US012536510B2

(12) United States Patent
Ogunsusi

(10) Patent No.: US 12,536,510 B2
(45) Date of Patent: Jan. 27, 2026

(54) METHOD AND SYSTEM FOR ONLINE MATCHMAKING AND INCENTIVIZING USERS FOR REAL-WORLD ACTIVITIES

(71) Applicant: Mark Ogunsusi, Washington, DC (US)

(72) Inventor: Mark Ogunsusi, Washington, DC (US)

(*) Notice: Subject to any disclaimer, the term of this patent is extended or adjusted under 35 U.S.C. 154(b) by 0 days.

(21) Appl. No.: 16/590,843

(22) Filed: Oct. 2, 2019

(65) Prior Publication Data

US 2020/0265526 A1 Aug. 20, 2020

Related U.S. Application Data

(60) Provisional application No. 62/713,545, filed on Aug. 2, 2018.

(51) Int. Cl.
*G06Q 50/00* (2024.01)
*A61B 5/024* (2006.01)
(Continued)

(52) U.S. Cl.
CPC .............. *G06Q 50/01* (2013.01); *A61B 5/024* (2013.01); *A61B 5/1118* (2013.01); *A61B 5/165* (2013.01); *G06F 16/24578* (2019.01); *G06F 16/9535* (2019.01); *G06F 21/31* (2013.01); *G06Q 30/0203* (2013.01); *G06Q 30/0215* (2013.01);
(Continued)

(58) Field of Classification Search
CPC ............... G06Q 50/01; G06Q 30/0631; G06Q 30/0203; G06Q 30/0215; G06Q 30/0235; G06Q 30/0277; G06Q 40/08; G06Q 50/265; A61B 5/1118; A61B 5/165; A61B 5/024; A61B 5/11; A61B 5/0205; A61B 5/117; G16H 40/67; G16H 50/70; G16H 20/17; G16H 20/10; G16H 30/40; G06F 16/24578; G06F 21/31; G06F 16/9535;
(Continued)

(56) References Cited

U.S. PATENT DOCUMENTS 6,275,811 B1 * 8/2001 Ginn ..................... G06Q 30/02
705/14.46
8,612,363 B2 * 12/2013 Karkanias ............. G16H 40/67
706/11
(Continued)

OTHER PUBLICATIONS

Panagiotis Petridis; Building Social Communities around Alternate Reality Games; Jul. 2011; IEEE.*

*Primary Examiner* — Arthur Duran
(74) *Attorney, Agent, or Firm* — Barry Choobin; Patent 360

(57) ABSTRACT

The present invention relates to a rank-based user-to-user and user-to-venue matchmaking. A user profile is created on a user device through a software application or website. The user can generate temporary points by performing various temporary points attributing actions as described above. The temporary points will become permanent points after real-world authentication process, the user may perform some predefined real-world activities to directly attribute points to the permanent points. The permanent points determine the rank or status of the user profile. Further, the user based on his/her user profile is enabled to view/match another user's profile. The real-world authentication and various other points attributing actions performed by a user have certain virtual or real-world benefits to the user.

11 Claims, 2 Drawing Sheets

Figure 1:
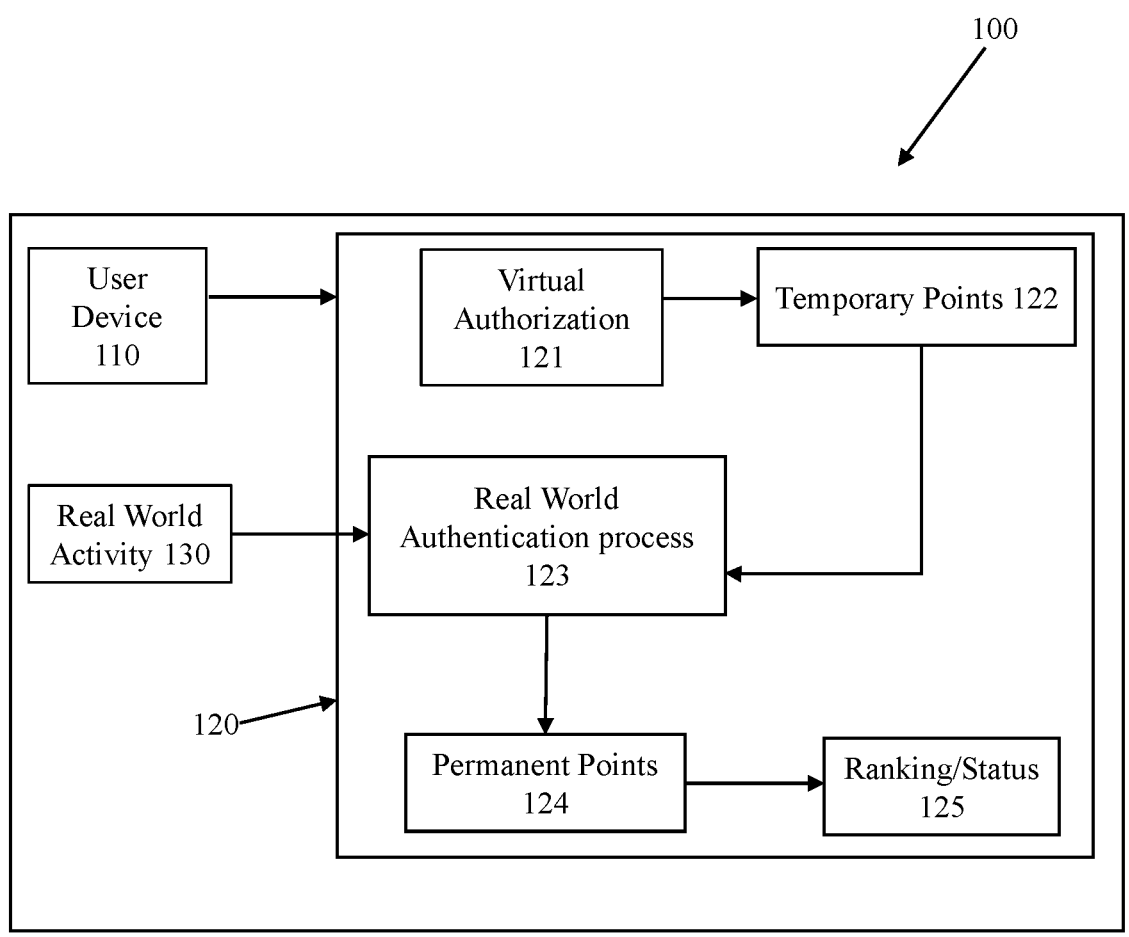

(51) Int. Cl.

| | |
|---|---|
| *A61B 5/11* | (2006.01) |
| *A61B 5/16* | (2006.01) |
| *G06F 16/2457* | (2019.01) |
| *G06F 16/9535* | (2019.01) |
| *G06F 21/31* | (2013.01) |
| *G06Q 30/0203* | (2023.01) |
| *G06Q 30/0207* | (2023.01) |
| *G06Q 30/0235* | (2023.01) |
| *G06Q 30/0241* | (2023.01) |
| *G06Q 30/0601* | (2023.01) |
| *G06Q 40/08* | (2012.01) |
| *G06Q 50/26* | (2024.01) |
| *G16H 40/67* | (2018.01) |
| *G16H 50/70* | (2018.01) |
| *H04L 67/306* | (2022.01) |
| *H04L 67/52* | (2022.01) |

(52) U.S. Cl.
 CPC ..... *G06Q 30/0235* (2013.01); *G06Q 30/0277* (2013.01); *G06Q 30/0631* (2013.01); *G06Q 40/08* (2013.01); *G06Q 50/265* (2013.01); *G16H 40/67* (2018.01); *G16H 50/70* (2018.01); *H04L 67/306* (2013.01); *H04L 67/52* (2022.05)

(58) Field of Classification Search
 CPC ........... G06F 2221/2111; G06F 21/316; H04L 67/306; H04L 67/18
 See application file for complete search history.

(56) References Cited

U.S. PATENT DOCUMENTS

| | | | |
|---|---|---|---|
| 8,783,563 B1* | 7/2014 | McGhie | G06Q 30/0227 235/487 |
| 10,706,684 B1* | 7/2020 | Sanford | G07F 17/3244 |
| 2002/0026348 A1* | 2/2002 | Fowler | G06Q 30/0208 705/14.13 |
| 2007/0179853 A1* | 8/2007 | Feige | G06Q 30/00 705/14.27 |
| 2010/0041454 A1* | 2/2010 | Huang | G09B 19/0015 463/44 |
| 2012/0226743 A1* | 9/2012 | Smargon | G06Q 20/06 709/203 |
| 2013/0231188 A1* | 9/2013 | Berberich | G06Q 30/0201 463/40 |
| 2013/0311294 A1* | 11/2013 | Ward | G06Q 30/0264 705/14.64 |
| 2014/0310089 A1* | 10/2014 | Cullen | G06Q 30/0233 705/14.33 |
| 2016/0132608 A1* | 5/2016 | Rathod | H04W 4/21 707/722 |
| 2016/0255139 A1* | 9/2016 | Rathod | H04N 1/32101 709/203 |
| 2017/0193280 A1* | 7/2017 | Huang | G06F 16/784 |
| 2017/0249671 A1* | 8/2017 | Dinh | G06Q 30/0643 |
| 2019/0098255 A1* | 3/2019 | Bergmann | G06Q 10/1093 |
| 2019/0108686 A1* | 4/2019 | Spivack | G06Q 30/0277 |
| 2019/0163270 A1* | 5/2019 | Da Silva | A61B 5/744 |
| 2019/0180637 A1* | 6/2019 | Mealer | G16H 50/50 |
| 2021/0042854 A1* | 2/2021 | Hazy | G06F 21/6245 |
| 2022/0083126 A1* | 3/2022 | Iwaki | G06F 3/012 |
| 2022/0358935 A1* | 11/2022 | Hvelplund | G10L 17/22 |

\* cited by examiner

METHOD AND SYSTEM FOR ONLINE MATCHMAKING AND INCENTIVIZING USERS FOR REAL-WORLD ACTIVITIES

FIELD OF THE INVENTION

The present invention relates to a system and method for online rank and publication-based user-to-user and user-to-venue matchmaking, more particularly, relates to a method for authenticating identities and incentivizing the online users for real world activities.

BACKGROUND OF THE INVENTION

The present invention relates to a system and method for online rank and publication-based user-to-user and user-to-venue matchmaking. More particularly, the present invention relates to a method for authenticating identities and incentivizing online users for real-world activities.

Dating and other social networking applications are becoming popular among people to meet new individuals and remain in touch with friends, relatives, colleagues and the like. Online dating applications represent a popular way for millennials to meet and to begin relationships whether for friendship, romance, or the pursuit of shared interests. Such applications have evolved from mere text messages and calls, in the past, to more sophisticated services offering photographs, videos, highly detailed profiles, and predictive compatibility tests, all intended to allow a user to be matched more precisely with a set of potential new acquaintances or dates.

Despite a myriad of advancements in the conventional online dating applications, the known applications of the art still suffer from one or more heretofore unrecognized and inadequately addressed disadvantages such as, but not limited to: user loneliness or isolation within a virtual existence or tech-based system; ghost user accounts; user deception; over-reliance on superficial user information; and over incentivization to perform virtual activity rather than real activity. The user of the known applications holds control over his or her profile and could specify what information in the profile is displayed to others, whether accurate or fabricated. Thus, a major drawback of conventional online dating services is that the users tend to restrict themselves to the virtual world or to virtual personas without generating meaningful real relationships and interactions in the real or physical world. Conventional applications seek to keep users focused on their tech devices, rather than interact in reality.

Furthermore, another heretofore unrecognized disadvantage of current online dating applications is that spending a large proportion of time online may negatively affect the psychological and physical health of the user. These existing applications, through use of superficial profile and personality depictions, foster an unreal portrayal of filtered, photoshopped, or edited user personalities, while simultaneously encouraging users to remain complacent in and with such superficial "virtual" personalities, a methodology of superficial matchmaking that has not and cannot sustain a properly evolving species.

Moreover, current online matchmaking applications do not provide adequate protections against fake, catfish, or simply inactive profiles, which may result in user frustration and psychological withdrawal from meaningful dating experiences, thereby further adding to the virtual isolation threat.

Therefore, a novel and heretofore unnoticed need is recognized for an online matchmaking service that overcomes the above-mentioned disadvantages of conventional online dating and other matchmaking applications.

The term matchmaking herein connotes any instance whereby a user perceives another user, in real-world or virtual reality, and indicates positively or negatively an opinion, through technological observation or human observation, on the perceived user's representation, traits, or profile, whether virtual or in-person. Also, the online matchmaking applications include online dating application, and both are interchangeably used hereinafter.

The term "venue" connotes any location wherein the social or economic activities of users may be monitored either through technological means or human observation.

SUMMARY OF THE INVENTION

It would be highly advantageous, therefore, to alleviate the shortcomings and the deficiencies inherent in the conventional online dating and other matchmaking applications. Therefore, a principal object of the present invention is directed to a rank-based based system for user-to-user and user-to-venue based matchmaking, and a method implemented by the system.

Another objective of the present invention is that the present invention weeds out fake users or fake profiles.

Still another objective of the present invention is that the users can be publicly ranked based on their virtual and real-world activities.

Yet another objective of the present invention is that the users can be incentivized for and to commit real-world activities.

A further objective of the present invention is that the users can be punished for missing/avoiding any of the real-world activities.

Yet another objective of the present invention is to utilize virtual activity of the user to further incentivize real world activity through real world point conversion requirements.

It should be understood that the present invention disclosure is not limited to particular systems and methodologies described herein, as there can be multiple possible aspects of the present invention disclosure which are not expressly illustrated herein. It is to be understood that the terminology used in the description is for the purpose of describing the particular versions or embodiments only and is not intended to limit the scope of the present invention disclosure.

BRIEF DESCRIPTION OF THE ACCOMPANYING DRAWINGS

Figure 2:
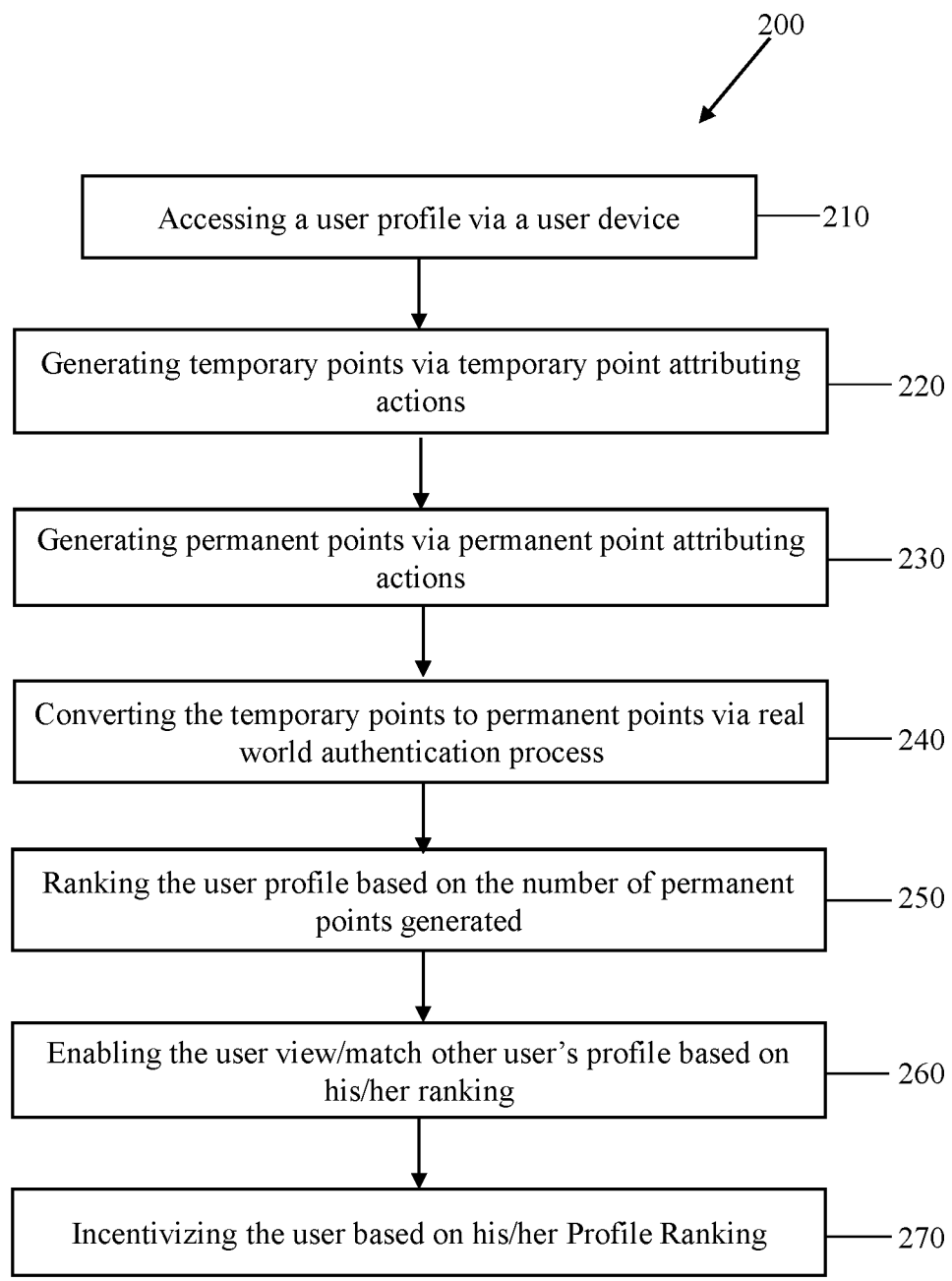

The accompanying drawings illustrate the best mode for carrying out the invention as presently contemplated and set forth hereinafter. The present invention may be more clearly understood from a consideration of the following detailed description of the preferred embodiments taken in conjunction with the accompanying drawings wherein like reference letters and numerals indicate the corresponding parts in various figures in the accompanying drawings, and in which:

FIG. 1 illustrates a block diagram of a rank-based matchmaking system according to a most preferred embodiment of the present disclosure; and FIG. 2: illustrates a flowchart of the rank-based matchmaking system according to the most preferred embodiment of the present disclosure.

DETAILED DESCRIPTION OF THE PRESENT INVENTION

Embodiments of the present invention disclosure will be described more fully hereinafter with reference to the accompanying drawings in which like numerals represent like elements throughout the figures, and in which example embodiments are shown.

The detailed description and the drawings illustrate specific exemplary embodiments by which the disclosure may be practiced. These embodiments are described in detail to enable those skilled in the art to practice the disclosure. It is to be understood that other embodiments may be utilized, and other changes may be made, without departing from the spirit or scope of the present disclosure. The following detailed description is therefore not to be taken in a limiting sense, and the scope of the present disclosure is defined by the appended claims. Embodiments of the claims may, however, be embodied in many different forms and should not be construed as limited to the embodiments set forth herein.

Embodiments of the present invention disclosure are discussed below with reference to the Figures. However, those skilled in the art will readily appreciate that the detailed description given herein with respect to these figures is for explanatory purposes as the disclosure extends beyond these limited embodiments. For example, it should be appreciated that those skilled in the pertinent art will, in light of the teachings of the present invention disclosure recognize a multiplicity of alternate and suitable approaches depending upon the needs of the particular application to implement the functionality of any given details described herein beyond the particular implementation choices in the following embodiments described and shown. That is to say that there are numerous modifications and variations of the present invention disclosure that are too numerous to be listed here, but that all fit within the scope of the disclosure. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this disclosure belongs. Preferred methods, techniques, devices, and materials are described, although any methods, techniques, devices, or materials similar or equivalent to those described herein may be used in the practice or testing of the present disclosure. Structures described herein are to be understood also to refer to functional equivalents of such structures. The present disclosure will now be described in detail with reference to embodiments thereof as illustrated in the accompanying drawings.

In one embodiment, at least one entity hereinafter ("Base User") acts on or within ("Virtual Activity") a technological system ("Virtual System"). Virtual Activity may also constitute any activity performed by at least one other user that is regarding or directed to a Base User, representation of a base user, or a representation that is associable with a Base User. For instance, Base User attributable Virtual Activity may include, but is not limited to, establishing, through usage of a processing device interfacing with a computer readable medium such as a mobile device, a representative presence or depiction of a Base User, whether knowingly or unknowingly, such as creating a Base User profile or causing a Base User profile to be created on a dating application system or website. Another example of attributable Base User Virtual Activity may include at least one other user liking or commenting on a post made by or containing a representation of a Base User. Another example of Base User attributable Virtual Activity may include a Base User merely viewing the virtual depiction of some other entity or location. Additionally, the viewing by at least one user of a Base User's persona or depiction in a Virtual System may constitute Virtual Activity in this embodiment. Another example of Virtual Activity may include a Base User's sonic representation being uploaded to or depicted on or within a virtual platform. Likewise, Base User attributable Virtual Activity may also include at least one other user listening to or viewing, within a Virtual System, a sonic depiction or visible depiction, such as a work of art, that in whole or in part may be representative of a Base User. In this embodiment, vibrations felt by at least one other user through use of a wearable device, for example, of a sonic depiction of a base user depicted within a Virtual System, may constitute virtual activity.

Another example of Virtual Activity may include a user, knowingly or unknowingly, engaging in an AI-based/machine learning based personality assessment, thereby causing or allowing for an AI-based/machine learning based virtual persona to be created and published in a virtual simulation through various available means of personality assessment and AI-based personality learning and depiction. The Base User AI-based persona does not require a full personality match to be associable with the Base User. A skilled artisan will easily understand the available technological art enabling AI-based personality trait detection, AI persona creation, and persona depiction. Examples of personality traits detection and personality trait extrapolations or determinations through artificial intelligence or machine learning systems are widespread and accessible in the prior art, including, among many other examples, computer-implemented systems and methods for personality analysis based on social network images or, for example, machine learning systems detecting user personality traits from brain scanning or eye movements during everyday behavior. Virtual Activity attributable to a Base User Activity, whether by a Base User's direct activity or by the perception of a Base User's persona on a virtual platform by at least one other user, may be assigned at least one short-term value or to at least one category associated with a short-term value, hereinafter referred to as "POPP3N Credit," by storing on a non-transitory computer readable medium descriptive data related to the Virtual Activity and processing of such data by at least one processor according to a set of computer readable instructions. Instructions related to POPP3N Credit attribution to a Base User profile may, for example, be preset according to a previously determined algorithm or may be adaptive, based on internal or external data points and machine learning based adjustments and extrapolations. For instance, instructions for adaptable attribution of POPP3N Credits may include a relative amount of POPP3N Credits being assigned for a Virtual Activity, where the amount of POPP3N Credits is determined, at least in part, by the total amount of a certain Virtual Activity occurring within a user subset or by the total amount of Virtual Activity occurring within a user subset. This embodiment may additionally include removal of at least one POPP3N Credit from a Base User Profile as determined by predetermined or adaptive computer readable instructions. Instructions may, for example, be stored on non-transitory media or obtained from multiple, interacting or noninteracting, non-transitory media and processors.

Moreover, Virtual Activity may include machine learning-based predictable feedback of a Base User or at least one other user directed to a Base User or Base User's persona in a Virtual System. Machine learning-based or AI-based predictable feedback may be ascertained from pattern recognition systems or any machine learning systems that account for a user's prior and present virtual or real-world activity as well as activity data derived from at least one other entity. A skilled artisan readily understands the available technological means for machine learning and extrapolations based on a subset of recordable or observable data. Predictable feedback from a Base User or at least one other user may constitute Virtual Activity to which POPP3N Credits may be attributed to a Base User. For example, a Base User may upload or publish a photograph, or some other virtual representative depiction, into a virtual system. A machine-learning system may observe and analyze characteristics of the uploaded Base User depiction and ascertain a likeability or viewability determination based upon prior Base User or other user responses to a set of virtual or real stimuli. Based upon ascertainments made by at least one machine learning system, POPP3N Credit may be attributed or removed from a Base User's profile through use of preset or adaptive instructions stored on a computer readable medium.

This embodiment does not limit the methods or systems of determining any feedback that may be directed to or associable with a Base User's depiction on or within a Virtual System. One of ordinary skill in the art may easily find a plethora of feedback determination methods and systems in the current art, such as biometric monitoring to indicate physiological and psychological response to a virtual stimulus on or within a Virtual System. As one of many examples, a wearable device, for instance, worn over at least one other user's eyes that monitors directly or through another device the heart rate, blood pressure, or brain waves, for example, of the at least one other user, may determine, through many different existing and developing technologies, a psychological response the at least one other user is experiencing when a Base User's associable depiction is observed by the at least one other user on or within a Virtual System. In this one of many examples of response determination means within the art, a determination or prediction of a psychological response may be considered Virtual Activity associated with a Base User for which POPP3N Credits may be attributed to a Base User's Profile according to adaptive or preset instructions. In this embodiment, POPP3N Credits may be represented in an observable published or unobservable nonpublished format by either being, for example, (1) transmitted from a computer readable medium to a processor which determines POPP3N Credit information in an observable format, such as by forms of vibration or as information on a screen attached to a non-transitory medium upon which the data is stored or to at least one other computer readable medium that may process and generate observable information, for example; or by (2) remaining stored in an unobservable unpublished, but computer readable, format on a non-transitory computer readable medium.

For the purpose of this embodiment and matchmaking system, user feedback response to a set of stimuli may further involve any currently or developing physiological state detecting systems or devices that may be implemented to determine the Base User's physiological and, relatedly, psychological state by either comparing biometric or physically observable and recordable feedback data with baseline/threshold data markers obtained from prior stored and or processed biometric and or physically observable and recordable feedback data under certain conditions related to virtual stimuli on or within a Virtual System. A Base User's biometric and or physically observable and recordable feedback data may, alternatively or additionally, be compared to biometric and or physically observable and recordable static or AI-based adaptive feedback data metrics obtained from one or more users through currently existing or developing cloud based systems, including but not limited to, servers or multitudes of interacting smart devices, otherwise known as the "Internet of Things" as applied to neural networks and machine learning. Biometric data, for example, may be interpreted through currently existing machine learning systems to personally tailor thresholds and predictive metrics to a particular Base User through predictive analytics and or other currently available means of machine learning. Machine learning based data metrics may, for example, be determined from the Base User's historical response data or at least one other user's response data to stimuli on or within a Virtual System. All available and developing methods of determining any user's actual or predicted physiological or psychological response to any stimuli, virtual or in-person, are incorporated herein and are well known to skilled artisans of the field.

In this same embodiment, a Base User may act ("Real Activity") on or within the real world ("Real World") through real world in-person perception of real stimuli. For example, a Base User may experience and demonstrate observable or AI-based predictable feedback, a form of Real Activity, to Real World stimuli perceived in-person or in the real world. Real Activity data may be determined, predicted, or directly indicated by a Base User in relation to at least one Real World stimulus. Data regarding Real World stimuli may be detected and stored according to any currently available means of detection, observation, or prediction that exist or is being developed in the art. For example, data regarding at least one Real World stimuli may be detected, determined through various extrapolative methods or systems, or predicted by available machine learning/AI-based methods and systems by detection through the use of, for example, (1) wearable devices that monitor field of vision and or focus; (2) camera monitoring systems that monitor field of vision, direction, or general presence; (3) currently available or developing tracking systems for determining location or proximities of objects; (4) satellite systems for visually determining the location of an object; (5) thermal monitoring systems; (6) camera or satellite systems for determining the direction an entity is facing or moving; (7) audio monitoring devices and systems for determining characteristics of noise emitting objects and or the direction an object is facing; (8) particle sensors; (9) electromagnetic energy sensors; (10) color sensors; (11) light refraction sensors; (12) weight sensors; (14) and or any other means of observing or determining an object's traits or characteristics. An object may include at least one other user. Any Real World data detectable, determinable, or predictable regarding the at least one other user may include the at least one other user's presence, direction of movement, happiness, biometric data, or any other physical or psychological attributes determinable through direct monitoring or AI-based machine learning of detectable characteristics in the Real World. Real Activity may also constitute any activity or representation that is associable with a Base User and observed by or determined from at least one other user, including predictable feedback and observable feedback such as biometric-based data and or psychological state extrapolations, for example. For instance, a Base User may paint any image or take any photograph, all of which constitute associable representations of the Base User, that is visually observed by at least one other user in the Real World. All aforementioned methodologies of determining the at least one other user's determinable or predictable physiological and or psychological feedback to the Base User's Real World stimuli may be implemented to determine Real Activity attributable to the Base User's profile. Yet another example of Real Activity may include a Base User AI-based/machine learning based persona being formed by a device or network of devices, being uploaded to a robotic system, and portrayed to at least one other user in-person or in the Real World. Such robotic depiction does not require the prior knowledge of the Base User.

In all instances of detecting, observing, recording and or predicting a Base User's in-person experienced Real World stimuli or a Base User's Real Activity, data regarding the Real World stimuli or Real Activity is stored, including all traits or parameters detectable by currently available or developing means of detection or observation in the art, including, but not limited to, time stamps, width, color, height, temperature, energy signature, weight, psychological state, movement speed, or any other features, characteristics, or traits detectable, determinable, or predictable by technology existing or being developed in the art for detection or ascertainment of the Real Activity or Real World stimuli. The data regarding the Real World stimuli or Real Activity is stored on at least one computer readable medium. A skilled artisan would understand the large multitude of currently available and developing methods of machine learning systems and methods for processing and determining a Base User's exhibited and predictable level and type of physiological and psychological response to at least one Real World stimulus. The characteristics may be processed according to currently available or developing machine learning methods and systems to categorize Real World stimuli according to the Base User's Real Activity level and type of physiological and psychological response to the at least one Real World stimulus. Moreover, a Base User's Real Activity as derived from at least one other user's feedback to associable representation or depiction of a Base User in the Real World may be ascertained through machine learning technology currently available. In this embodiment, any of the Base User's observed or determined actual or predicted Real Activity, including feedback from at least one other User regarding Base User Real World stimuli, may be assigned at least one long-term value or to at least one category associated with a long-term value, hereinafter referred to as "POPP3N Points," by storing on a computer readable medium descriptive data related to the Real Activity and Real World stimuli. Such data is processed by at least one processor device according to a set of instructions. Instructions related to POPP3N Points attribution to a Base User profile may, for example, be preset according to a previously determined algorithm or may be adaptive, based on internal or external data points and machine learning based adjustments and extrapolations from data repositories or interacting smart devices, for example. This embodiment may additionally include removal of at least one POPP3N Point from a Base User Profile as determined by preset or adaptive computer readable instructions. Instructions may, for example, be stored on at least one computer readable medium or obtained from multiple, interacting or noninteracting, devices. For example, POPP3N Points may be attributed at a greater value for certain Real Activity, such as in-person matching.

In this embodiment, POPP3N Points may be represented in an observable published or nonpublished format by either being, for example: (1) communicated to at least one user through any technology-based perceivable means, such as through various types of device vibrations upon POPP3N Point acquisition or as information on a screen of at least on device; or by (2) merely remaining stored in an unpublished format on a computer readable medium.

In this embodiment, POPP3N Credit data may be removed ("Credit Expiration") by, for example, full deletion, overwriting, or storage in an unobservable unpublished, but computer readable, format when at least one event occurs, which may be determined by a set of instructions, preset or adaptive, stored on a computer readable medium. For example, Credit Expiration may occur through computer readable instructions that set a designated time period or an adaptive relative interval of time ("Credit Period") during which an event must or must not occur. The occurrence or lack of occurrence of Credit Expiration may be based on predetermined or AI-based adaptive instructions stored on a computer readable medium. For example, in an embodiment, POPP3N Credit is deleted each week on Monday at 5 A.M. unless Base User Real Activity is detected. In the same embodiment, the occurrence of at least one event ("POPP3N Event") may cause POPP3N Credit to be converted to POPP3N Points by execution of predetermined or AI-based adaptive instructions. For example, a set of computer readable instructions triggering a POPP3N Event may require or be strictly dependent upon a Base User engaging in Real Activity during a Credit Period. Instructions for a Credit Period, Credit Expiration, or POPP3N Event, for example, may include quantifications or measurement descriptors that anticipate relativity, such as temporal relativity as one of many examples, and may be quantified or measured based upon a Base User's actual experience or in accordance with another relative system of measurement or quantification. For example, a Base User engaged in a virtual simulation wherein the Base User may experience a relative difference in time passage than another user in the Real World, may accrue more or less POPP3N Credit based upon experienced time lapse in comparison to a user in the Real World. In this variant, through preset or adaptive instructions on a computer readable medium, the Base User's Credit Period may be set relatively or adaptively. This may be accomplished through feedback detection, data aggregation, and or neural network processing of the Base User's current and prior data and or at least one other User's feedback and data in formation of instructions determining the Credit Period. As such, attributed POPP3N Credit may be reduced relative to at least other user's temporal experience as determined according to stored and processed data of all points attributed throughout the system or subset of the system, by stored algorithmic instructions or as determined by adaptive AI-based algorithmic instructions and extrapolative data points. Attributed POPP3N Credit and POPP3N Points may also vary based upon relative activity in an area or by relative activity of any subset of a user group through similar means of predetermined or relative instructions.

In the same embodiment, POPP3N Points may be associated with relative rank ("POPP3N Status") within a matchmaking framework with various attributable benefits and services allocated to each rank ("POPP3N Perk"). The method of allocating users to a rank category may be determined through preset or adaptable instructions stored on computer readable medium. These instructions may stratify users based upon POPP3N Points data stored under a user's profile on a computer readable medium. POPP3N Status may constitute a POPP3N Points-based category, number, or any other relative representation for aggregating users retaining similar amounts of POPP3N Points. For example, the depiction of the total amount of likes, comments, or matches a Base User has accrued may be a depiction of a Base User's POPP3N Status. Other similarly situated POPP3N users may be described according to the same POPP3N Status descriptor. As another example, User's with a certain amount of POPP3N Points may be aggregated into a gold, silver, bronze, or diamond subset as POPP3N Status. User Ranking may be publishable to other Users in the system, users outside of the system, or may alternatively be hidden.

In the above embodiment and other embodiments, POPP3N Points data may be removed ("POPP3N Expiration") by, for example, full deletion, overwriting, or storage in an unobservable unpublished, but computer readable, format when at least one event occurs, which may be determined by a set of instructions, preset or AI-based adaptive, stored on a computer readable medium. For example, POPP3N Expiration may occur through computer readable instructions that set a designated time period or an adaptive relative interval of time ("POPP3N Period") during which an event must or must not occur. The occurrence or lack of occurrence of POPP3N Expiration may be based on predetermined or AI-based adaptive instructions stored on a computer readable medium. As such, POPP3N Points may reduce relatively, in this or another embodiment, according to stored and processed data of all points attributed throughout the system or throughout at least one subset of the system, for example. POPP3N Points may also vary based upon relative activity in a user group or user subset based upon any data variable. As another example, a user profile may fully be removed, suspended, or inactivated, for example, based upon level of activity as determined by preset or adaptive AI-based activity metrics and monitoring instructions.

Instructions indicating a POPP3N Period are not required to be temporally related. For instance, a POPP3N Period may be based on instructions concerning the total number of occurrences of a predefined or adaptively defined event or set of events. As one of many examples, a POPP3N Period may be set as a total of 200 notified check-ins at a particular location or venue by users or nonusers of the matchmaking system. POPP3N Expiration of POPP3N Points is not required in the present invention but is one of many variants and applications of the rank-based matchmaking invention that may incentivize further Real Activity and Virtual Activity.

User-to-User rank based matchmaking may occur: through currently available anonymous matchmaking systems and methods available in the art; through predictive methodologies based on observable indicia of psychological or physiological state, such as biometric determinations of interest as one example; through directly communicated interest demonstrations currently available in the art, such as a direct comment made to a user who has a certain amount of matches or followers, or a direct comment on a user's post who has a certain amount of prior likes or comments; or through other rank-based methods of matching such as gold status users being able to view and contact gold status members and below ranked members; silver status members being able to view and contact silver status members and below, and so forth, for example.

Instructions for POPP3N Point attribution to a user's profile may be directed toward incentivizing certain Real World activity. For example, in one embodiment variant, in-person matching (to "POP" or be "POPPING") may be attributed a higher value of POPP3N Points than other Real Activity, such as purchasing a physical item. The act of POPPING may be observable through any available detection methods and systems of data transfer, such as GPS tracking, RFID tracking, or physically tapping phones for information transfer validation, to name a few. For example, a Base User and at least one other user may be determined to be POPPING by the two users' devices sending a status report to a server. The server may process the data contained in the status report to determine whether or not a valid POP has occurred. This may occur, for example, by the server utilizing time and position data contained in the status report from the devices to determine if the devices were at the same physical location at the same time. If the server determines the POP to be valid, the server, which contains the POPP3N Points attribution instructions, may inform the two user devices, establish a transfer of information between devices, and attribute the instructed POPP3N Points to the stored user profiles. In the event of an invalid POP, the server may inform the devices, but will not establish the POPP3N Point attribution and will not establish the information transfer between devices. The POPPING instance between two users may occur through data transfer between devices by way of a server, another intermediary, or directly between devices, for example. The POPP3N Point attribution will occur through storage of processed data on a computer readable medium and may remain unpublished or be published to the individual user, both users, the entire matchmaking user base, non-users, or subsets of the matchmaking system user group through transmission to particular devices. For example, POPPING through physical tapping of phones may generate greater points than POPPING through scanning QR code or vice versa. Moreover, POPPING provides heretofore unforeseen benefits over the various methods of in-person data transfer alone, such as tapping phones, because POPPING generates unforeseeable Real Activity incentivization through the attribution of POPP3N Points within the larger rank-based matchmaking system, replete with published or unpublished rank or status information. POPPING for POPP3N Points acquisition provides heretofore unforeseen benefits and incentive for generating Real Activity, in addition to virtual activity generation, because a user can gain any number of POPP3N Perks, such as greater access to the rank-based matchmaking users group; status, persona depiction, and or user activity publication to the rank-based matchmaking user group and or non-user group; general or profile particularized deals at various POPP3N business users and or non-users; rank-based access to various POPP3N business users or non-users; access to any generalized locations associated with the POPP3N system; a greater potential of acquiring comments and likes on posts to generate POPP3N Credit for further POPP3N Point acquisition; conversion of POPP3N Credit to POPP3N Points; as well as many other advantages.

Another incentive-based variant example of this embodiment includes the limitation of a Base User, or a persona associable with a Base User, being viewable or perceivable by prior matches only. In this embodiment variant, only a Base User's current match group will have access to comment, like, or express any predictable, extrapolated, or direct feedback on a Base User's virtual representation. As such, the Base User is provided further incentive to POP in-person and to virtually match in order to increase the Base User's base match group ("Base Match Group"), which will in turn increase the prospect of a Base User generating POPP3N Credits through comments and likes on posts viewable only by the Base Match Group. An example of this may include a feed upon which a Base User and a Base Match Group can post or cause to be posted any observable representative depiction. In this same variant, a Base User may be further incentivized to find suitable matches through group check-in incentives. For example, a greater amount of POPP3N Credit may be attributed to a Base User's profile when a Base User is determined to be physically present at a physical location with a predefined group of users. In this variant, the Base User will only be able to communicate and aggregate with a group of prior in-person or virtual matches. This variant embodiment may include group chats ("POPP3N Teams"), for example, wherein a base user may select, from a list of prior matches or the Base Match Group, at least two other users to join a group discussion. An alternate variant to the embodiment may simply include a Base User's posts being made public to any user or nonuser and a Base User being able to add any user or nonuser to a POPP3N Team, rather than prior matches from the Base Match Group alone, which may create less of an incentive to match, but more of an incentive to post quality virtual content and generate more meaningful matches.

As a further variant, this embodiment may provide an additional unforeseen incentive for greater Real Activity by means of POPP3N Point attribution to a Base User for POPPING with higher ranked users. More specifically, a Base User may POP in-person with a higher ranked user, through a phone tap for example, thereby generating a greater amount of POPP3N Points than the Base User would have acquired through POPPING with a lower rank user. In this example, the Base User may not know the other user's ranking prior to POPPING in the Real World, thereby incentivizing greater conversation and observation of a prospective match resulting in higher quality matching. A skilled artisan will understand the many ways of facilitating phone-tapping-point-acquisition-based matchmaking.

As a further variant, this embodiment may provide an additional unforeseen incentive for greater Real Activity by a set of computer readable instructions that attribute a greater amount of POPP3N Points for certain sequential or instantaneously large amounts of Real Activity (to "POP-OFF" or be "POPP3N"). For example, a detection system or device may monitor the amount and quality of dancing of a Base User. This may be monitored through any currently available means of motion detection, vibration, or observation, such as camera monitoring, accelerometer monitoring, physical viewing, floor vibration monitoring, or any other form of monitoring physical movement. The quality of movement or dancing may be determined by examining the movements through AI-based, user feedback, or non-AI based systems based on stored data containing other movement characteristics, music beat and vibration characteristics, or music type, tone, or classification characteristics. Based upon predetermined stored or AI-based variable instructions, the Base User's movement or dancing may be associated with a quality score or categorization. The score or determination may be published or depicted to the user or a set of users through a screen depiction for example. The screen depiction may be a meter reaching a max tipping point for example. Upon reaching the preset or adaptive maximum point, a representative depiction of success may be demonstrated on a device screen to a user or user group, thereby triggering attribution of POPP3N Points and or publication to a user group that the Base User is POPP3N, which may in turn provide further opportunity for users and non-users to demonstrate interest in the Base User, which provides yet another means of the Base User accruing POPP3N Credit. When a Base User becomes POPP3N, a greater amount of POPP3N Points and or point amplifiers may be attributed to the Base User's stored profile.

Another example of how a Base User may become POPP3N is through economic transaction based Real Activity. For example, a Base User may purchase an item at a user or non-user business, such as a food or drink. Data regarding the economic transaction is stored on a computer readable medium, which may interface with a set of predetermined or adaptive instructions. Based on the stored data and the instructions, the food or drink purchase, for example, is assigned a value, which may be demonstrated on a screen simply or through a process of gamification, wherein a bottle fills with liquid. The more purchases that a Base User makes, the more the bottle fills with liquid, for example. Upon successful purchase of a predetermined or adaptively set number of items, food or drink for example, the screen depicted bottle may pop emitting fluid, thereby informing that the Base User is POPP3N. Upon becoming POPP3N, the Base User may be notified of a set of advantages or services for becoming POPP3N, such as a free drink or food item. Moreover, the Base User may receive point amplifications for a period of time, thereafter, may have the POPP3N status published to users or non-users allowing for further POPP3N credit generation, and/or may be granted access to different abilities or content in the POPP3N system. Any number of iterations or applications may be anticipated by this gamified variant of an POPP3N occurrence within a rank-based matchmaking framework. A skilled artisan can clearly understand and apply this gamification and user activity incentivizing framework to a vast range of industries and services.

In this embodiment of the invention, a user or Base User may constitute any entity, including a business entity. A skilled artisan will readily understand and fully utilize available methods of monitoring and recording all attributable Virtual Activity of a Base User business entity, including, but not limited to characteristics of advertisements made in a Virtual System; characteristics of a targeted audience of advertisements made in a Virtual System; characteristics of an actual audience of advertisements made in a Virtual System; characteristics of products offered in a Virtual System; economic data regarding activity occurring in a Virtual System; characteristics of services provided in Virtual System; characteristics of comments made in a Virtual System, characteristics of virtual personas, depictions, or representations of the Base User business made in a Virtual System; comments made by at least one other user in regards to the Base User business or any partial depiction of the Base User business made in a Virtual System; the characteristics of at least one other user that views or experiences a Base User business's online persona; and as any other observable Virtual Activity associable with the Base User business. Virtual Activity is not limited to fully associable activity of a Base User business only; partially associable Base User business Virtual Activity may include AI-based or non-AI-Based patterns or trends of an industry within which a Base User business regularly engages in Virtual Activity, for example. Any representative, associate, or associable entity to a Base User business may be observed for associable Virtual Activity attributable to the Base User business. For example, a Base User Business, contractor, employee, or associate, for example, may post an advertisement on a social media platform for a service or product. The invention described herein would ascertain all characteristics of the virtual advertisement as well as attribute POPP3N Credit to the Base User business for the Base User Activity associable thereto. The invention described herein, would store the POPP3N Credit value to a computer readable medium in accordance to a value determined by a set of instructions on a computer readable medium. Likewise, the present invention, would predict or ascertain all feedback provided from at least one other user regarding the Base User business's advertisement. The matchmaking system would store the feedback characteristics as well as attribute POPP3N credit value, which may or may not be negative POPP3N Credit, to the POPP3N Base User's profile through processing and storage of the characteristics and related POPP3N Credit value on a computer readable medium according to a set of preset or adaptive instructions.

Moreover, a skilled artisan would utilize available means of monitoring a Base User's Real Activity through all technological means of observing a Base User's Real World associable characteristics, including, but not limited to, busiest time periods at a physical location, characteristics of products sold in the Real World, characteristics of contractors and employees working in the Real World, characteristics of services provided in the Real World, characteristics of Real World patrons, characteristics of Real World patronage, characteristics of Real World physical advertisements, characteristics of targeted audience of Real World physical advertisements, sonic representations played by or of the Base User Business in the Real World, characteristics of geographically similarly situated businesses, characteristics of industry related businesses operating in the Real World; and any other AI-based or non AI-based discernable or predictable Real World characteristics of the Base User business or associable Real World characteristics of at least one other user concerning the Base User business. Base User business Real Activity may directly generate POPP3N Points as well as convert POPP3N Credit to POPP3N Points. For example, in one embodiment, a Base User business may be a nightclub. The Base User nightclub could accrue a value of POPP3N Credits through online posts on a Virtual Systems, such as social media platforms. A POPP3N Period, in this embodiment, may be the time from which the first Virtual Activity-based advertisement is posted to the end-time of the nightclub's advertised event. The POPP3N Event, in this embodiment, may be defined as a preset or adaptive amount of user's who must purchase at or attend the event advertised prior to POPP3N Expiration, the advertised event end-time. In this embodiment, POPP3N Credit is converted to POPP3N Points only if the POPP3N Event requirement is met. In an alternative embodiment, a Base User business may only acquire POPP3N Points through associable Real Activity, rather than through the additional means of POPP3N Credit conversion.

In the above-mentioned embodiments, a Base User business's ranking may be stored and unpublished or published in any number of ways. Publishing of a Base User Business's ranking may occur through publication of the Base User's ranking, through use of a meter ("POPP3N Meter"), to demonstrate the level of Real Activity occurring at the Base User business's physical location, for example. The POPP3N Meter ranking may be a direct or relative representation of a Base User business's POPP3N Points acquired through the matchmaking system overall or relative to a subset of users or nonuser activity. In another embodiment, the Base User Business's ranking may provide the Base User business benefits within the matchmaking framework, including, but not limited to, access to users of the same or lower ranking; access to nonusers as part of the overall matchmaking systems outreach and advertising methods; greater access to the Virtual System aspects of the matchmaking system; as well as any other benefit.

Another variant of the embodiment may include communication between a Base User and at least one other user as a promotional methodology for generating further user activity ("POPP3N Promotion") within the POPP3N matchmaking system. For example, a Base User may propose, through a POPP3N system-based communication or direct communication outside of the POPP3N system, an offer ("POPP3N Offer") to a POPP3N business. One example of a POPP3N Offer may include, but is not limited to, a Base User submitting to a restaurant or nightclub business user: (1) prospective group size; (2) code name "POPP3N Code"; (3) expected date of attendance; (4) requested discount amount; (5) check-in time; (6) discount time duration; (7) total sales amount during a time period; or (7) any other variants of a promotional offer commonly understood in the art and industry. In addition to potentially receiving at least some variably determined POPP3N Credit value for offer submission, the Base User may receive a greater amount of POPP3N Points for (1) successful acceptance of the POPP3N Offer by the business user and (2) successfully meeting the user group size or sales criteria, for example, that the POPP3N Promotion entails. Data regarding any characteristics of submitted and approved POPP3N Offers are recorded and further utilized in the POPP3N matchmaking system. Likewise, a POPP3N Promotion may include a Base User business submitting to at least one other user a POPP3N Offer, which may result in a higher POPP3N Points attribution to the Base User business or the at least one other user upon the occurrence of the terms of the POPP3N Promotion. POPP3N Promotions within the POPP3N matchmaking system may be applicable between any two users regarding any prospective social or economic interaction, whether Virtual Activity-based or Real Activity-based. For instance, two or more non-business users may execute a successful POPP3N Promotion for a private social party, so long as the criteria are validated by the POPP3N matchmaking system. Moreover, another example of a POPP3N Promotion may include a political candidate executing a political fundraiser by proposing a POPP3N Promotion to the candidates Base Match Group, the successful occurrence of which could result in a greater amount of POPP3N Points being attributed to the political candidate user as well as attending users.

Due to the notable importance of social locations as grounds for facilitating in-person matchmaking, the present invention particularly discloses an embodiment for a venue-to-user matchmaking system. The POPP3N venue-to-user matchmaking is merely a variant of the larger user-to-user matchmaking system. The POPP3N venue-to-user matchmaking system utilized automated or venue-representative direct feedback ("Venue Activity") monitoring, both Venue Virtual Activity and Venue Real Activity. In this embodiment, Base User venues ("Base User Venues") may demonstrate and receive recordable virtual feedback data on a Venue's virtual activity through any and all of the aforementioned examples of Virtual Activity ascertainment. A Base User Venue may constitute any business or location at or in which economic and or physical interaction may occur. For instance, a Base Venue may be a bar, restaurant, shopping center, stadium, festival, parade, or any other location. A Base User Venue may be a Base User business or merely any ascertainable location in which physical and or economic activity may occur generally. A Base User Venue may demonstrate a preference for or interest in a user or user subset through AI-based and non AI-based detectable and recordable means of Venue Real Activity and Venue Virtual Activity, such as characteristics of events held; busiest time periods at the venue; food types served; how often users are POPP3N at the Base User Venue; what type of users become POPP3N at the Base User Venue; music played; nearby venue characteristics; characteristics of users observed or detected to be in attendance at the venue; online or Virtual System-based deals and product offerings and characteristics thereof; characteristics of similarly defined venues;

characteristics of trade activities occurring at venue; or any other characteristics. For example, Base User Venues that advertise or host certain types of events, such as salsa dancing for example, may virtually or physically demonstrate interest in a user or user subset of the POPP3N rank-based matchmaking system. As another example, a Base User Venue may post promotions preferencing a particular rank subset of the POPP3N system of users or the Base User Venue may post promotions directed to characteristics of a POPP3N subgroup or rank, for example. Many other observable characteristics of a venue or venue cohort may be ascertained in determining a venue preference for a user or user subset. This data may also be determined from existing methods of Real Activity observation and may be generated through check-ins and purchase data recorded by existing methods of determining purchase volume, busiest times, or other observable means of determining POPP3N Venue Real Activity and preferences. Venues may also demonstrate interest in a POPP3N system user or subgroup directly by approving a specific user or submitting a POPP3N Promotion directed to a user, for example. A Base User Venue's determined or directly indicated preferences may be depicted to at least one other user or non-user directly, through deals, publication, or direct notifications, for example, or a POPP3N Venue may anonymously match with a user or user group by determinable, predicted, or direct indication of interest without publication until a user or user group demonstrates likewise interest in the POPP3N Venue or POPP3N Venue type. Importantly, all Virtual Activity and Real Activity of the Base User Venue may generate POPP3N Credit and POPP3N Points in the POPP3N rank-based matchmaking system, which in turn may grant the Base User Venue greater access to prospective user matches, for example. Base User Venue POPP3N Status may be published to the entire POPP3N system user group, to subsets of the POPP3N system user group, or to nonusers. The Base Venue User may further be provided services and advantages in the POPP3N matchmaking system that include, but are not limited to, access to other business users, such as professional service providers, manufacturers, distributors, or other business users. This business-to-business matchmaking component provides further opportunity for deal formations, POPP3N Credit acquisition, and POPP3N Points acquisition. A business or venue user may likewise be POPP3N according to preset or adaptive instructions used to process recordable data concerning the business or venue user Real Activity.

In one variant of the embodiment, a Base User Venue is assigned POPP3N Credit and POPP3N Points associated with a particular subset type as a form of POPP3N Status, such as venue type subsets, such as bars, music halls, high end nightclubs, or any other venue type or subset variable. Accordingly, a Base User Venue may be granted access, for matchmaking purposes, to POPP3N user groups that meet the rank and subset type criteria of the venue, for example. One example of this embodiment variant of venue-to-user matchmaking may include a Base User Venue attaining the POPP3N Status of a diamond level EDM nightclub, for example. The diamond rank is associated only with the EDM nightclub subset and is based on all ascertainable data concerning the Base User Venue's associable Virtual Activity and Real Activity. As such, the Base User Venue could be granted the according benefit of access to POPP3N system users that have achieved Diamond Status based on POPP3N Points earned primarily at EDM nightclubs, as well as all lower ranking users that achieved POPP3N Points primarily at EDM Nightclubs. In this same embodiment, a Base User Venue with bronze level rank in the EDM nightclub subset, will not be able to access POPP3N system users with diamond level status without the diamond status user indicating interest in the bronze level Base User Venue first. This example variant of the POPP3N System is just one example of the many different subsets that may be utilized in a category or points-based rank-based matchmaking system that can be utilized to (1) generate Real Activity as well as (2) facilitate more appropriate matches. Another exemplary derivation of the embodiment variant may include higher point attribution to POPP3N system users of lower rank that gain access to engage in Real Activity at a higher ranked Base User Venue. Alternatively, a lower ranked Based User Venue may receive a greater amount of POPP3N Points for Real Activity undertaken by POPP3N Users of a higher rank at the Base User Venue. For instance, a diamond level POPP3N system user who becomes POPP3N at a silver status Base User Venue, may cause a greater amount of POPP3N Points to be attributed to the Base User Venue than a bronze POPP3N system user undertaking the same activity.

All activity recorded on the POPP3N system may be published to all POPP3N system users, nonusers, or POPP3N system user subsets in any and all formats, such as a meter indicating the most active POPP3N venues in real time or historically, for example. The POPP3N system provides a heretofore unforeseen method of incentivizing user and venue activity, while simultaneously facilitating the acquisition of real data to be used in generating more appropriate matches.

The present invention anticipates all variants of advantages, disadvantages, and iterations associable with the POPP3N rank-based matchmaking system. Indeed, the invention fully anticipates the many prospects of incentivizing or disincentivizing user activity in both the Real World and Virtual System, rather than the Real World only. User rank-based POPP3N Status advantages, POPP3N Perks, may include any cognizable relative advantage or disadvantage in both a Virtual System or the Real World. For example, a Base User with a higher POPP3N Status can access other users within the same POPP3N Status or below, whereas an at least one other user ranked below a Base User cannot view a Base User profile without the Base User intending to be observable by the at least one other user. Other POPP3N Perks of POPP3N Status may include, but are not limited to, Real World access to buildings, events, economic deals, government officials, or any other cognizable relative benefit. Users may be incentivized through this system in any and all obvious extrapolations from the disclosure made herein, including but not limited to, added POPP3N Points for verifiable group outings, added POPP3N Points for observable activity at certain times, added POPP3N Points for Virtual Activity undergone in Real World circumstances, such as check-ins or tags, or higher visibility, points, and publicity of high scoring users on a leaderboard, for example. Any considerable benefits or POPP3N Perk based on Real World or Virtual Activity may be implemented and are fully anticipated by the present invention through the assignment of value, which may take the form of POPP3N Points and may be relative or adaptive. Cryptocurrency and financial technology implementation into the POPP3N system is fully anticipated by the present disclosure and could include, but is not limited to, assignment of cryptocurrency in addition to or in lieu of POPP3N Points or Credit; allowance of trading of POPP3N Points for cryptocurrency through any currently available or developing technology or systems; delayed vesting of cryptocurrency value based upon targeted predetermined or AI-based adaptive benchmarks of activity; and any other iteration of cryptocurrency into the existing framework, such as use of cryptocurrency or non-cryptocurrency as a means of purchasing rank or unlocking in-system advantages or POPP3N Perks. The present invention fully anticipates the trade of POPP3N Points between POPP3N users and non-users.

The present disclosure fully anticipates bonus periods to incentivize users to engage in Real Activity. The present disclosure fully anticipates requiring economic activity for users to trigger a POPP3N Event. The present disclosure fully anticipates facial recognition technology, implantable devices, and any other technology that may directly indicate psychological or physiological preference as well as data points from which physiological or psychological determinations may be derived. The present invention fully anticipates and discloses autonomous vehicle matchmaking through monitoring of drive ride patterns and user direct and indirect feedback for determining: (1) the most comfortable ride to facilitate an in-person or virtual matchmaking event associable with POPP3N Credit or POPP3N Points; (2) recording ride times and frequency as well as user associated physiological and psychological states to arrange and incentivize the ideal opportunities for autonomous vehicle speed dating through use of sensors in and throughout the car, including but not limited to, cameras, biometric monitors, or any other sensor devices, all of which may be associable with POPP3N Credit or POPP3N Points; (3) use of a neural network of smart device interactions to determine matches and ideal times for autonomous vehicle speed dating associable with POPP3N Credit or POPP3N Points; and or (4) correlating POPP3N Credit and POPP3N Points to users who engage in virtual video-conference-based and in-person in-vehicle dating, for example.

The present invention fully anticipates implementation of all discernable user data detection devices and utilizing this data in backend algorithm determinations for prospective match suggestions in addition to the aforementioned ranking system. Such discernable user data may include any identifying, descriptive, or ascertainable data through AI-based machine learning techniques. Such data may include a user's school history, phone history, exercise history, food preferences, clothing preferences, entertainment preferences, or any predictable or discernable information based upon currently available detection and predictive analytical technology. The present invention fully anticipates any form of matchmaking, whether it be romantic, plutonic, romantic and plutonic, scholastic, collegial, or competitive. Accordingly, the present disclosure anticipates the use of the POPP3N matchmaking system as a method of aggregating students to after school tutors, study partners, or teachers for after school non-vehicle related or intra-autonomous vehicle homework completion and assistance associable with POPP3N Credit or POPP3N Points. The present disclosure describes a method of (1) determining focus level, (2) ensuring homework is completed, (3) identifying psychological state during the completion of after school work, and (4) incentivizing prompt and diligent completion of homework through point attribution, point conversion, student/tutor ranking, and student/tutor matchmaking associable with POPP3N Credit or POPP3N Points. The aforementioned method and system fully anticipate any work-based activity, whether school related or not, and a technological system for incentivizing activity. Any and all Real or Virtual Activity may be ascertained, weighted, attributed, and recorded in the present system.

Moreover, the present system fully anticipates virtual reality meetings and offers a novel approach to encouraging real world meetings, while simultaneously acknowledging the convenience, ease, and widespread adoption of Virtual Activity. The present invention, for the first time, acknowledges the need for and provides a nexus between Virtual Activity and Real Activity, through activity incentivization and a rank-based matchmaking technological system. Additionally, the present disclosure anticipates gamification of individual instances of Virtual Activity and individual instances Real Activity through alternative depictions or representation, such as a POPP3N Meter, of value for real world activity in relation to the entire user group, prospective user group, or within a closed user group subset. For example, in one embodiment, data regarding certain activities such as food purchases, drink purchase, or recorded dancing activity and acumen (1) may be detected and stored on a computer readable medium; (2) the activity may be attributed certain characteristics or points in an open or closed user group such as a certain amount of dancing or purchases filling a virtual bottle with liquid; and (3) when a predetermined or AI-based adaptable threshold metric is achieved, a visual representation on a display, for example, may show the occurrence of the threshold event, which may or may not qualify the user for additional advantages or services, both virtual and real world. This form of gamification, which may involve more or less immediate advantage-based feedback, may further incentivize users to participate in the overall technological matchmaking system, which inevitably encourages more Virtual Activity and Real Activity. Through this novel system of user-to-user and user-to-venue matchmaking, Virtual Activity may be used merely as a tool of incentivizing Real Activity in the Real World thereby bringing user interaction into great consistency with millions of years of evolutionary practice.

The present invention anticipates many other applications of the POPP3N rank-based matchmaking framework, such as many applications to the health care industry. In one embodiment of the invention, the POPP3N rank-based matchmaking system may include Base User patients ("Base User Patient") and pharmaceutical product entity users within the matchmaking system. A Base User Patient's Virtual Activity could include, but is not limited to: frequency of uploading biometric data into a Virtual System; data from various physiological markers recordable on a virtual system, such as blood pressure, blood glucose, blood cholesterol, serum neurotransmitter levels, blood creatinine, or any other biometric marker that may be uploaded to a Virtual System; monitor, comment, or viewing of biometric data, for example, by at least one other person in a Virtual System; and other Virtual Activity representations of a Base User Patient. Moreover, Virtual Activity of a Base User Patient may include searching health related terms on a Virtual System; inquiries to health providers transmitted on a Virtual System; non-health related searches, comments, and activity made on a Virtual System that may be used to ascertain psychological state; biometric response data to observed or perceived Virtual Stimuli to indicate or relate to any psychological or psychological status or disease state; medical evaluation data uploaded by a provider, caregiver, or AI-based derivations or extrapolations; medical reports and impressions generated by a provider, caregiver, AI-based derivation, or any other source; genetic data, AI-based derivations from genetic data, and any other determinations from genetic data uploaded to a Virtual System; family medical history data or extrapolations that have been uploaded to a Virtual System, or any other health relatable data associable with a Base User patient uploaded to or ascertained from a Virtual System. A Base User Patient may receive positive or negative POPP3N Credits based on this information according to and weighted by instructions stored on a computer readable medium. A Base User patient may receive positive or negative POPP3N Points for real activity undertaken within the framework. Such Real Activity could include, but is not limited to, medication adherence, such as how often a medicine bottle is opened; provider visits; pharmacy visits; in-person refill requests; phone-based refill requests; actual physical biomarkers demonstrating physiological or psychological state; gym visits; healthy food purchases; unhealthy food purchases; jogging; stretching; or any other Real Activity determinable or predictable through current technology of the art. A skilled artisan is well aware of the multitude of monitoring parameters mentioned and unmentioned here implementable for ascertaining, predicting through large data and AI-based predictive analytics, and recording Real Activity of a Base User Patient. Based upon the type and quality of the Base User Patient's Real Activity and the POPP3N Points attributed therefrom, a health-related rank-based determination of a Base User Patient's profile may be determined according to many variants of instructions contained on a computer readable medium. For instance, a diabetic Base User Patient may be classified as a level 4 compliant Base User Patient for diabetic treatment, where the lower the number the better the compliance of a Base User patient to a predetermined or adaptive medication regimen determined by a provider or system. In this same embodiment, various health-related user entities may be considered POPP3N system users and ranked according to various criteria such as ease of use or required frequency of use, for example. In this variant, examples of POPP3N system health-related user-entities could include, but is not limited to, insulin delivery systems and products; oral diabetes medications; blood level monitoring devices such as standard test trips versus wearable meters or sensors; or diabetic compounds and creams, for example. These health-related user entities may be attributed POPP3N Credits and POPP3N Points based upon criteria concerning Virtual Activity and Real Activity involving these entities, such as how easy these user entities are reportedly used, how often these user entities are prescribed, required frequency of use, adverse effects reported about these user entities, patient satisfaction reported regarding these user entities, patient metrics improvement or deterioration based upon use of the user entities, or any other Virtual Activity or Real Activity ascertainable by technology of the art. Under this embodiment variant of the present invention, Base User Patients may be successfully incentivized to improve and remain compliant to medication regimen by receiving advantages due to Real Activity concerning positive POPP3N Point attribution to their profile. Advantages may include, discounts on medications, discounts on doctor visits, insurance premium reductions, tax benefits, or any other possible benefits or POPP3N Perk. Indeed, base user entity formulary addition or removal, for example, can be effectively achieved through the POPP3N method and system for matchmaking. As such, patients stratified, through this novel rank-based system, to a particular adherence subset, for example, may be matched to a user entity product based upon the ease or frequency of use of the product, for example. For instance, a noncompliant diabetic Base User Patient with a low POPP3N rank-based system adherence POPP3N Status, may be matched with a once a week subcutaneous injection user entity, a product which would have a low adherence requirement rank, rather than a user entity product requiring three times a day subcutaneous injection, a product which would have a high adherence requirement rank. The present invention anticipates AI-based and medical provider extensions of a Base User Patient with the ability to view and make decisions regarding a Base User Patient's prospective user entity matches. Many different iterations and applications of the POPP3N rank-based matchmaking system are anticipated in the present invention and span across any known or unknown disease states. The present invention presents a novel technology for incentivizing quality health care, patient accountability, and positive patient outcomes through a novel incentive structured rank-based matchmaking system, replete with rewards, POPP3N Perks, for Base User Patient Real Activity within the healthcare sphere. Another variant for positive Real Activity of a Base User Patient may include attributing POPP3N Credit to any virtual activity, whether health related or not, and requiring a health care-based Real Activity POPP3N Event to convert POPP3N Credit to POPP3N Points. In a related variant, the POPP3N rank-based matchmaking system may include user-to-provider matchmaking, user-to-insurer matchmaking, or many other variants. The present invention anticipates all variants and iteration of the POPP3N rank-based matchmaking system in any industry.

Other exemplary embodiments of the present invention may be related to matchmaking to professional service providers through a rank-based system with related POPP3N Status rank subsets related to service cost, service quality, service time requirement, or other means of ranking a service. Other exemplary embodiments of the present invention may relate to any user entity subgroup such as apartment user entities, hotel user entities, grocery store user entities, or any other business user entity.

The present invention anticipates all iterations of gamification that may stimulate Virtual Activity and Real Activity toward any economic or non-economic activity. For example, greater POPP3N Points or Credit attributed to users who complete a challenge comprising at least one activity. Any cognizable means of depicting a game are anticipated herein. The present invention also anticipates intra-venue user-to-user or user-to-venue challenges and games as a means of generating further Real Activity or Virtual Activity. The present invention anticipated any inter-venue user-to-user or user-to-venue challenges and games. Any gamification throughout the POPP3N rank-based matchmaking system, whether individual user-to-user or group-to-group games, are fully anticipated by this disclosure. The present invention also anticipates the applicability of previously establish virtual footprints on various virtual platforms or Virtual Systems as direct or immediate means of attributing POPP3N Credit and POPP3N Points. The present invention fully anticipates virtual dating, autonomous vehicle interaction, political party or candidate matching or affiliation, or any other variant of the present invention. The present invention anticipates brain and physiological implantable devices for enhancement of user capabilities, data acquisition, and matching. The present invention fully anticipates augmented reality applications for various functionality, such as suggesting prospective matches or demonstrating gamification, for example.

Under this invention, matching is not limited to merely when two users directly express positive interest in each other. This invention anticipates all means of ascertaining a user's physiological interest, psychological interest, depicted interest, associable interest, predictable interest, or any other means of interest determination, whether direct or indirect. Accordingly, two human users may match based upon at least one human's interaction with a virtual persona or robotically depicted persona of the other human user, for example. Referring to FIG. 1 shows a block diagram of system 100 in accordance with a most preferred embodiment of the present invention. The system 100 is shown to have a user device 110, the user device 110 is having a user profile/dashboard 120 for each user. The user profile 120 comprises personalized data of a user. The user profile 120 includes a permanent point repository (not shown) and a temporary point repository (not shown). The temporary point repository stores temporary points 122 collected by a user via virtual authorization 121 of himself or herself. The permanent point repository stores permanent points 124 earned by a user directly via a real-world authentication process 123 or conversion of temporary points 122 into permanent points 124 via the real-world authentication process 123. The real-world authentication process 123 is completed through a real-world activity 130. The Permanent Points 124 earned by the user are determining a ranking or status 124 of the user profile 120.

Referring to FIG. 2, a flowchart 200 of the present invention according to the most preferred embodiment of the present invention is shown. At step 210, the user accesses the user profile 120 through the user device 110. The user profile 120 can be accessed via a mobile application installed in the user device 110 or via a website. The user upon opening the user profile 120 generates temporary points 122 at step 220, via temporary point attributing actions including a virtual temporary point attributing actions and an in-person temporary point attributing action.

The virtual temporary point attributing actions is including but not limited to following actions:
  positive, negative, or neutral feedback/comments on user profiles;
  like/dislike/pass on each user's photo through a gesture;
  uploading pictures (immediate feedback of points attributed);
  pictures being liked by other users;
  sharing the app (software application) on other social media platforms;
  commenting on venues;
  providing feedback on the app;
  providing feedback on venues;
  adding users to group chats;
  advertising a venue to a group;
  prospective matches/followers commenting; and
  showing interest in a user's pictures/representation.

The in-person temporary point attributing actions is including but not limited to the following actions:
  repeat check-in with the same users demonstrating date quality/reliability;
  repeat check-in at the same venue;
  check-ins with groups; and
  accelerometer-based movement synchronization to music beat vibration/pulse
    duration-based point attribution or accelerometer-based movement without music beat synchronization determination—point attribution—duration based, etc.

Further, at step 230 the user generates permanent points 124 through permanent point attributing actions including conversion of the temporary points 122 into permanent points 124 through real-world authentication process at step 240, or an in-person direct permanent point attributing actions which may include:
  singular purchases;
  purchases that meet the threshold amount, thereby triggering a "POPP3N" event resulting in a higher amount of permanent point attribution;
  repeat check-in with the same users demonstrating date quality/reliability; and
  check-ins with groups etc.

Based on the number of permanent points 124 earned by the user the system 100 ranks or classifies the user's profile at step 250. Further, at step 260 the user is enabled to view/match a plurality of other user's profiles depending on his/her ranking. Higher ranking users may view (for the purpose of expressing interest or disinterest or skipping) lower ranking users, but lower ranking users may not view higher-ranking user's profile without being directly linked by a higher-ranking user first. The process of expressing interest, disinterest, or skipping can, for example, be gesture-based (slide picture left or right or up), verbal (stating into device like/skip/dislike), physical (shaking the device various ways to demonstrate interest or disinterest), taping yes/no/like/dislike/skip, or other methods of demonstrating a decision.

Importantly, upon the user making a choice, direct feedback as to the point amount attributed to the user's activity will be given to the user, such as a number being visually displayed on the device screen. For example, if a user slides a prospective match's picture left or right, a small +1 appears on the screen during the gesture thereby demonstrating the short-term/temporary point attributed to the action. The total points may be viewed by the user or accessed by the user on the user profile/dashboard 120.

Furthermore, at step 270 the system automatically incentivizes the user based on his permanent rank/status (bronze, silver, gold, etc.) with any number of benefits that may unlock advantages/perks in the app and in the real world. Advantages/perks may include, but are not limited to, the reduced entry fee, skipping lines, specific deals, specific free items, very important person (VIP) treatment, venue access, venue subset group access, viewing users that have liked you, expressing direct interest in specific users, backstage passes, celebrity meetings, private party invitations, private dinners, etc.

User status or rank is published on user profile to all users who are able to view the profile. Time period-based point leaders are published to all users or all users in a region. For example, weekly point leaders are placed on a leader board at the top of a picture feed section to further increase points through photo/profile likes and to further incentivize users to go out on a consistent basis.

In one exemplary embodiment, the ranking is relative ranking i.e. the ranking is relative to other users. For example, the ranking of a user can be a function of the total points in the system and the total number of users in the system. In this case, the points of a particular user remain static, while the points of other users increase, or the total points in the system increases, the static points of the particular user will relatively decrease. This relative or adaptive points attribution may ensure that users remain active in the system. For relative ranking, the whole system may be considered or any group or subset. For example, relative ranking can be based on users in a geographical range, users in a gender group, users in a school group and like.

Users are encouraged to validate or convert their temporary points at particular locations. These venue participants, real human or robot/AI (artificial intelligence) machine, can validate users through visual or iris verification, biometric identification, or any other method of identification of a person. The validation may occur through a transaction, but may not be required. For example, a user, through geolocation tagging by transmittal to a network server on a device (or multiple interacting smart devices), may transmit user location as being present at a venue, thereby unlocking and allowing the user to view the venue's menu from the user device i.e. a mobile device.

The user may select the item he/she intends to purchase, such as a drink or beverage. The device transmits this selection to a server which then transmits this data to the venue bartender by showing the user's picture and order selection on a device screen (mobile or immobile device) at a bar, hotel or restaurant site, for example. The order is placed in a queue and a notification is sent to the user that the order is being prepared and for the user to go to the bar location for pickup. Upon the user arriving at the bar located at the venue, the bartender can complete the order by selecting verify from a device queue screen, the bartender in this instance visually verifies the user is present based on the picture shown on the device screen. The user then accepts the order through a gesture or other technique or verbally, such as shaking his phone, scanning his phone, etc. The user's temporary points for prior virtual activity is now converted into permanent points for ranking improvement/determination through this authentication process. Now, the user may continue to increase ranking in order to participate in matchmaking with other higher ranked users.

The User check-in at various locations may be a requirement of the verification process and may occur through visual verification by a bouncer, an automated machine, or through automatic check through some location positioning system such as GPS (Global Positioning System), location tagging of a mobile device, or by a wearable device (for example), and/or a user may manually slide or click an icon, for example, to check-in if location determined to be exact through a positioning system. This data is transmitted to a server in order to validate points and convert to permanent points for ranking for matchmaking.

This data derived from the validation process may include, but is not limited to, common venues attended, activity amount at said venues (how much user dances, purchases, how long user stays, venue patterns over a period of time, demographics at said venues). This data may be used not only to determine how active the venue is in order to publish to all users, but this data may be used in AI-based and non-AI based matchmaking processes by determining a plurality of user profiles within rank-based cohort based on similar or likely matching traits. For example, user demographics of certain venues may evidence the sexual preference and/or interest of certain users. This data can be used in matchmaking determination. Other usages of this data in the invention system may include, but is not limited to, ways to determine the most active/liked venue, etc. This data may be used in matching users to venues or suggesting venues to users through direct administrator directed marketing or automated notification from 7 pm to 1 am, as an example. The notification to the user of the most POPP3N venues functions in concert with entire authentication/ranking matchmaking system. All data may be used in AI process-based matchmaking systems and other matchmaking algorithms.

The POPP3N action/how a user becomes "POPP3N" at a venue, direct incentivization connected to ranking system: In a specific location, when a user participates in a threshold amount of transactions or activities, the user may successfully reach a threshold such as purchasing 3 drinks (hence POPP3N", or $25.00 worth of items, for example, and the user receives a reward, such as a free drink (buy 3 get 1 free)). This means 3 authenticated events transmitted to the ranking system to meet the threshold. Each purchase or activity is transmitted from venue device to server then to user device to show user visually on a mobile device (or through vibration or another sensory method) how close a user is to reaching the threshold. For example, for each drink purchased, an animated bottle fills up with liquid. When the threshold amount is reached, the bottle pops with a congratulatory notification of the reward received for reaching the threshold amount. The user is then provided with a theoretically larger amount of points that automatically go to the user's permanent point ranking.

In an exemplary embodiment, the venue-to-user matchmaking requires the venue/business to demonstrate venue interest in user or user subgroup through publication of interest in a certain group. Example of publication may include, but is not limited to, deals for a particular subset (e.g. all gold members get specific deal). The publications can be made common in the system or in a specific group. For example, a deal can be published for a college group in the system. Furthermore, the deal shall apply to the applicable users of the deal. i.e. the deal is applicable only to the users having GOLD ranking. Thus, the user to venue matching shall take into consideration such conditions of the publication of deals.

Other methods of representing activity may be vibrations of the device, the noise made by device, temperature, etc. Moreover, notifications may be sent out to all users in a venue of a particular user who is POPP3N. When a user is POPP3N/meets threshold amount, the user may be prompted to take a photograph/selfie, which may be uploaded to the system, published to users, on a POPP3N feed, whereby users may earn more temporary points for future validation/authentication.

The users gain long-term points through direct in-person activities monitored through technology, including but not limited to, sound sensors for verbal discussions, proximity matching for determining direct in-person meetings, motion sensors for dancing, quality of dancing determinations based upon matching motion with beat pulsations monitored through technology such as motion sensors or accelerometers, camera monitoring through facial recognition technology, etc. Validation processes are not merely limited to economic transactions. All technologically monitorable social interactions may be a form of in-person real world validation to convert short-term points into long-term points.

Venue Activity Feedback—Venue Ranking System: Each threshold amount reached may be transmitted and stored in the cloud or on transitory devices. User demographical data (sex, status, number of thresholds met, etc.), interaction data, number of users at venues, and user activities are stored and transmitted in real-time. This data is published in real-time to an entire user group or selected group of users to give direct feedback on particular locations, venues, brands, etc. to demonstrate which venues are real-time and/or historically the most popular at set times. This data may be presented in a rank-based system "Venue POPP3N Status" through visual representation such as an image or animation (how full a representative bottle is for each venue or a meter for each venue, for example) or numerical ranking or another method. Higher ranked venues receive various benefits in addition to publicity as a higher ranked venue. Higher ranking venues and all data may be used in AI process-based matchmaking systems and other matchmaking algorithms.

Venue Feedback and Population Data Aggregation: Data on venue popularity based on POPP3N events, preferred validation times, etc. may be collected and stored to make direct or AI process-based suggestions of popular products to stock, busy times, target demographics, etc. The data is transmitted to either transitory mobile multi-smart device servers or to non-transitory server storage devices.

Best Mode of using the present invention: To perform the present invention the user has to install a software application or has to visit the website link to create his/her profile. Once the user profile is created the user can generate temporary points by performing various temporary points attributing actions as described above. These temporary points will be erased after some predefined time if they are not validated or authenticated by a real-world authentication process by a real-world activity. The temporary points will become permanent points after authentication, the user may perform some predefined real-world activities to directly attribute points to the permanent points. The permanent points determine the rank or status of the user profile. Further, the user based on his/her user profile is enabled to view/match with at least one other user's profile. The real-world authentication and various other points attributing actions performed by a user have certain virtual or real-world benefits to the user.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A system for technological matchmaking between a first user and a second user, the system comprising:
    a first wearable device configured to detect a psychological status of a user while interacting with the system;
    a motion sensor configured to evaluate a real-world physical activity of the user;
    one or more processors; and
    at least one computer-readable medium comprising a set of instructions which when executed by the one or more processors causes the one or more processors to perform operations comprising:
        generating a user profile for the first user,
        receiving, via an interface implemented by the system on a first user device, at least one first parameter associated with a virtual activity of a plurality of virtual activities performed by the first user, and wherein the virtual activity is detected by the first wearable device,
        generating, by the system, one or more restricted points based on the at least one first parameter;
        assigning the one or more restricted points to the first user;
        defining an expiration period in which the one or more restricted points are set to expire and during which at least one predetermined event of one or more predetermined events must or must not occur for converting the one or more restricted points to one or more less restricted points, wherein the one or more predetermined events relate to real-world activities;
        determining, using the motion sensor at a predetermined real-world location, an occurrence of a predetermined event of the one or more predetermined events performed by the first user, wherein the predetermined event is associated with the virtual activity, wherein the performance of the predetermined event is for conversion of the one or more restricted points to the one or more less restricted points and does not involve a transfer of the one or more restricted points or the one or more less restricted points from the first user;
        upon determining the occurrence of the event, converting, by the system, the one or more restricted points to the one or more less restricted points, wherein the one or more less restricted points remain assigned to the first user without transfer;
        ranking the user profile of the first user based on at least the one or more less restricted points,
        providing, based at least on the ranking, appropriate matches to the first user and wherein the virtual activity and the occurrence of the predetermined event are detected by different devices.

2. The system of claim 1, wherein the presence of the first user at the predetermined real-world location is detected from a geo-location of the first user.

3. The system of claim 1, wherein the virtual activity comprises uploading a photograph through the interface.

4. The system of claim 1, wherein the virtual activity comprises sharing one or more services in a group through the interface.

5. The system of claim 1, wherein the one or more restricted points are valid for a predetermined period, the predetermined period configured into the system.

6. The system of claim 1, wherein the system further comprises:
    an image processing device configured to determine a psychological status of the first user in the virtual activity.

7. The system of claim 1, wherein the virtual activity comprises at least one of posting a comment by the first user, posting feedback by the first user, posting a comment regarding the first user by at least the second user, posting feedback regarding the first user by at least the second user, submitting information related to the user profile of the first user by at least the first user, or submitting information related to the user profile of the first user by at least the second user.

8. The system of claim 1, wherein the system is used related to one or more autonomous vehicles.

9. The system of claim 1, wherein the system is used to enable matching students to at least one of at least one study group, at least one teacher, or at least one tutor.

10. The system of claim 1, wherein the system is used in at least one of pharmaceutical, health care, research, or legal applications.

11. The system of claim 1, wherein the appropriate matches comprise user-to-user matches and user-to-venue matches.

* * * * *